US012769015B2

(12) United States Patent
Chi

(10) Patent No.: US 12,769,015 B2
(45) Date of Patent: Oct. 20, 2026

(54) METHOD AND APPARATUS FOR RECEIVING AND TRANSMITTING CONFIGURATION INFORMATION AND READABLE STORAGE MEDIUM

(71) Applicant: Beijing Xiaomi Mobile Software Co., Ltd., Beijing (CN)

(72) Inventor: Liangang Chi, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 275 days.

(21) Appl. No.: 18/690,578

(22) PCT Filed: Sep. 13, 2021

(86) PCT No.: PCT/CN2021/118066
§ 371 (c)(1),
(2) Date: Mar. 8, 2024

(87) PCT Pub. No.: WO2023/035275
PCT Pub. Date: Mar. 16, 2023

(65) Prior Publication Data
US 2025/0138198 A1 May 1, 2025

(51) Int. Cl.
*G01S 19/25* (2010.01)

(52) U.S. Cl.
CPC .................................. *G01S 19/256* (2013.01)

(58) Field of Classification Search
CPC ........ G01S 19/05; G01S 19/256; G01S 19/40; G01S 19/41
(Continued)

(56) References Cited

U.S. PATENT DOCUMENTS 8,054,221 B1 11/2011 Luong et al.
2007/0066231 A1* 3/2007 Duffett-Smith ......... G01S 19/26 455/67.11
(Continued)

FOREIGN PATENT DOCUMENTS

WO 2021133239 A1 7/2021

OTHER PUBLICATIONS

Notice of Allowance issued by the State Intellectual Property Office of People's Republic of China on May 14, 2025, in corresponding Application No. CN 202180002877.2, 3 pages.
(Continued)

*Primary Examiner* — Brady W Frazier
(74) *Attorney, Agent, or Firm* — Finnegan, Henderson, Farabow, Garrett & Dunner, L.L.P.

(57) ABSTRACT

A method for receiving configuration information is performed by a terminal device in a non-terrestrial network (NTN). The method includes: determining first information and second information, wherein the first information corresponds to duration required for receiving a global navigation satellite system (GNSS) signal and acquiring GNSS positioning information according to the GNSS signal, and the second information corresponds to valid duration of the GNSS positioning information acquired by the terminal device; sending the first information and the second information to a network device; and receiving configuration information from the network device, wherein the configuration information is determined by the network device according to the first information and the second information, and the configuration information is configured to indicate a timing for the terminal device to determine to receive and process the GNSS signal to acquire or reacquire the GNSS positioning information.

18 Claims, 5 Drawing Sheets

(58) Field of Classification Search
USPC .................................................... 342/357.42
See application file for complete search history.

(56) References Cited

U.S. PATENT DOCUMENTS

| | | | | |
|---|---|---|---|---|
| 2008/0096527 | A1* | 4/2008 | Lamba | H04W 64/00 455/433 |
| 2010/0156709 | A1* | 6/2010 | Zhang | G01S 19/41 342/357.23 |
| 2015/0148063 | A1 | 5/2015 | Jung et al. | |
| 2015/0160349 | A1* | 6/2015 | Wang | G01S 19/05 342/357.42 |
| 2018/0188378 | A1* | 7/2018 | Rapoport | G01S 19/40 |
| 2019/0227179 | A1* | 7/2019 | Afzal | G01S 19/41 |
| 2020/0278451 | A1 | 9/2020 | Wei et al. | |
| 2022/0221586 | A1* | 7/2022 | Hansen | H04L 67/12 |

OTHER PUBLICATIONS

Extended European Search Report Issued in Application No. 21956452.3 dated Jun. 23, 2025, 8 pages.

International Search Report of International Application No. PCT/CN2021/118066, dated Jun. 20, 2022, 4 pages.

* cited by examiner

METHOD AND APPARATUS FOR RECEIVING AND TRANSMITTING CONFIGURATION INFORMATION AND READABLE STORAGE MEDIUM

CROSS-REFERENCE

The present application is a U.S. National Stage of International Application No. PCT/CN2021/118066, filed on Sep. 13, 2021, the entire content of which is incorporated herein by reference.

TECHNICAL FIELD

The present disclosure relates to a field of wireless communication technology, and more particularly to a method for sending and receiving configuration information, an apparatus and a non-transitory readable storage medium.

BACKGROUND

For a terrestrial network (TN) device using 5GNR technology, a round-trip delay within a communication cell is absorbed through a cyclic prefix (CP) of a physical random access channel (PRACH).

In addition, in communication process of the non-terrestrial network, some user equipment (User Equilibrium, UE) cannot take care of the positioning process and service data transmission of a global navigation satellite system (GNSS) at the same time.

SUMMARY

In view of this, the present disclosure provides a method for sending and receiving configuration information, an apparatus, and a non-transitory readable storage medium.

According to a first aspect of embodiments of the present disclosure, a method for receiving configuration information is provided, the method is performed by a terminal device in a non-terrestrial network and includes:

determining first information and second information, where the first information corresponds to duration required for receiving a global navigation satellite system GNSS signal and acquiring GNSS positioning information according to the GNSS signal, and the second information corresponds to valid duration of the GNSS positioning information acquired by the terminal device;

sending the first information and the second information to a network device; and receiving configuration information from the network device, where the configuration information is determined by the network device according to the first information and the second information, and the configuration information is configured to indicate a timing for the terminal device to determine to receive and process the GNSS signal to acquire or reacquire the GNSS positioning information.

According to a second aspect of embodiments of the present disclosure, a method for sending configuration information is provided, the method is performed by a network device in a non-terrestrial network NTN and includes receiving first information and second information from a terminal device; where the first information corresponds to duration required for receiving a global navigation satellite system GNSS signal and acquiring GNSS positioning information according to the GNSS signal, and the second information corresponds to valid duration of the GNSS positioning information acquired by the terminal device;

determining configuration information according to the first information and the second information, where the configuration information is configured to indicate a timing for the terminal device to determine to receive and process the GNSS signal to acquire or reacquire the GNSS positioning information; and sending the configuration information to the terminal device.

According to a third aspect of embodiments of the present disclosure, a communication apparatus is provided. The communication apparatus may be configured to perform the step(s) performed by the terminal device of the first aspect or any possible design of the first aspect described above. The terminal device may implement the functions of the above methods in a form of a hardware structure, a software module, or a combination of a hardware structure and a software module.

In a case that the communication apparatus shown in the third aspect is implemented by means of the software module, the communication device may include a processing module and a transceiver module coupled to each other. The processing module is configured for the communication device to perform a processing operation, such as generating information/message to be sent, or processing a received signal to acquire information/message, the transceiver module is configured to support the communication device to perform communication.

When performing the steps of the above first aspect, the processing module is configured to determine first information and second information, where the first information corresponds to duration required for receiving a global navigation satellite system GNSS signal and acquiring GNSS positioning information according to the GNSS signal, and the second information corresponds to valid duration of the GNSS positioning information acquired by a terminal device. The transceiver module is configured to send the first information and the second information to a network device, and the transceiver module is further configured to receive configuration information from the network device, where the configuration information is determined by the network device according to the first information and the second information, and the configuration information is configured to indicate a timing for the terminal device to determine to receive and process the GNSS signal to acquire or reacquire the GNSS positioning information.

It should be understood that the above general description and the following detailed descriptions are illustrative and explanatory only and are not used to limit embodiments of the present disclosure.

BRIEF DESCRIPTION OF THE DRAWINGS

The accompanying drawings illustrated herein are used to provide a further understanding of the embodiments of the present disclosure and constitute a part of the application, and the schematic embodiments of the present disclosure and illustrations thereof are used to explain the embodiments of the present disclosure and do not constitute an undue limitation of the embodiments of the present disclosure, in which.

The accompanying drawings, which are incorporated in and constitute a part of this specification, illustrate embodiments consistent with the present disclosure and, together with the description, serve to explain the principles of the embodiments of the present disclosure.

DETAILED DESCRIPTION

Figure 1:
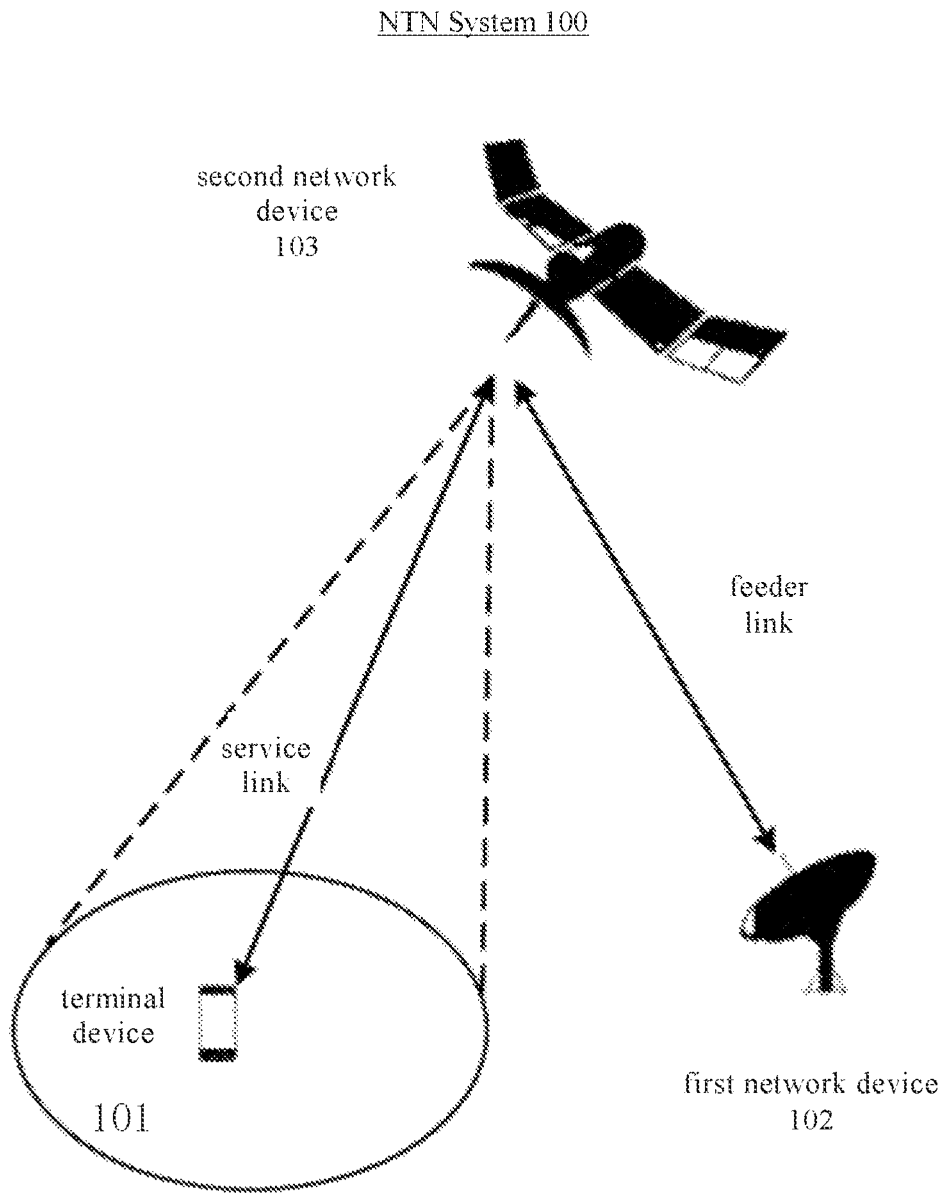
FIG. 1 is a schematic diagram of a non-terrestrial network system architecture provided by embodiments of the present disclosure.

Embodiments of the present disclosure are now further described with reference to the accompanying drawings and embodiments.

Reference will now be made in detail to embodiments, examples of which are illustrated in the accompanying drawings. The following description refers to the accompanying drawings in which the same reference numerals in different drawings represent the same or similar elements unless otherwise represented. The implementations set forth in the following description of embodiments do not represent all implementations in line with the present invention. Instead, they are merely examples of devices and methods in line with aspects related to the present disclosure as recited in the appended claims.

In order to implement global communication coverage of a 5th generation (5G) communication network, a 3rd Generation Partnership Project (3GPP) organization is studying adaptation of a new radio (NR) protocol to a non-terrestrial network (NTN). NTN communication includes satellite communication, air-to-ground (ATG) communication, and the like. Compared with the terrestrial communication, the NTN communication has different channel features, for example, a long transmission delay and a large Doppler (Doppler) frequency shift. For example, a round-trip delay of geostationary earth orbit (GEO) satellite communication (regeneration mode) is 238 ms to 270 ms. A round-trip delay of low earth orbit (LEO) satellite communication (orbit altitude 1200 km, regeneration mode) is 8 ms to 20 ms.

The method provided in the embodiments of the present disclosure may be applied to a non-terrestrial network (NTN) system 100. FIG. 1 shows a schematic diagram of a possible non-terrestrial network system architecture to which an embodiment of the present disclosure is applicable. The system 100 may include a terminal device 101 (or referred to as a user terminal or user equipment), a first network device 102, and a second network device 103. A communication link between the first network device 102 and the second network device 103 is a feedback link (a feeder link) (feeder link); and a communication link between the second network device 103 and the terminal device 101 is a service link (service link).

The terminal device 101 may be a wireless terminal device that may receive scheduling and indication information from the network device, for example, a device configured to provide a user with voice and/or data connectivity, a handheld device with a wireless connection function, or another processing device connected to a wireless modem. The wireless terminal device may communicate with one or more core networks or the Internet through a radio access network (such as a radio access network, RAN). The wireless terminal device may be a mobile terminal device, for example a mobile telephone (also referred to as a "cellular" phone or a mobile phone), a computer, and a communication chip. For example, the wireless terminal device may be a portable, pocket-sized, handheld, computer built-in, or vehicle-mounted mobile apparatus that may exchange language and/or data with the radio access network. The terminal may be specifically a device such as a personal communication service (PCS) phone, a cordless phone, a session initiation protocol (SIP) phone, a wireless local loop (WLL) station, a personal digital assistant (PDA), a tablet computer (Pad), or a computer with a wireless transceiver function. The terminal may also include a subscriber unit (subscriber unit), a subscriber station, a mobile station (mobile station), a mobile console (MS), a remote station (remote station), an access point (AP), a remote terminal device (remote terminal), an access terminal device (access terminal), a user terminal device (user terminal), a user agent, a subscriber station (SS), customer premises equipment (CPE), a terminal, a mobile terminal (MT), and the like. Alternatively, the terminal device may be a wearable device, a terminal device in a next-generation communication system such as a 5G network, a terminal device in a future evolved public land mobile network (PLMN), a terminal device in an NR communication system, or the like.

The first network device 102 may be a gateway (or referred to as a terrestrial station, an earth station, or a gateway) (gateway), and may be configured to connect the second network device 103 to a core network.

The second network device 103 may be a satellite (or referred to as a satellite base station), a geostationary earth orbit (GEO) satellite, a medium earth orbit (MEO) satellite and a low earth orbit (LEO) satellite in a non-geostationary orbit (NGEO), a high-altitude communication platform (HAPS), or the like, which is not limited herein.

In communication process of the NTN system, some terminal devices 101 with lower communication capability cannot simultaneously perform GNSS positioning and data transmission. Therefore, for this kind of the terminal device 101, the first network device 102 needs to determine corresponding configuration information such that the terminal device 101 may perform the GNSS positioning and the data transmission at an appropriate timing.

In the present disclosure, according to the capability regarding the GNSS positioning reported by terminal device 101 in the NTN communication, the first network device 102 may determine configuration information according to the capability, of the UE, regarding the GNSS positioning, thereby indicating a timing for the terminal device 101 to receive and process the GNSS signal to acquire or reacquire the GNSS positioning information, such that this kind of the terminal device 101 performs valid service data transmission while maintaining valid uplink synchronization.

Figure 2:
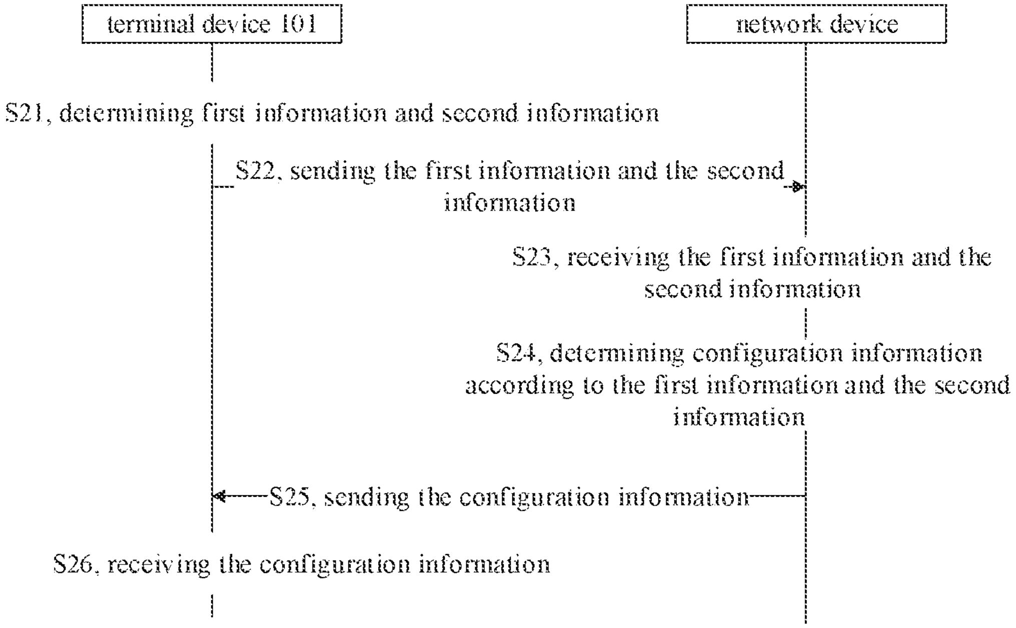
FIG. 2 is a flowchart of a method for sending configuration information according to an embodiment.

The embodiments of the present disclosure provide a method for receiving configuration information. Referring to FIG. 2, FIG. 2 is a flowchart of a method for sending configuration information according to an embodiment, as shown in FIG. 2, the method includes steps S21 to S26:

step S21, a terminal device 101 determines first information and second information, where the first information corresponds to duration required for receiving a global navigation satellite system GNSS signal and acquiring GNSS positioning information according to the GNSS signal, and the second information corresponds to valid duration of the GNSS positioning information acquired by the terminal device.

step S22, the terminal Device 101 sends the first information and the second information to a non-terrestrial network NTN device.

step S23: the network device receives the first information and the second information from the terminal device 101.

step S24: the network device determines configuration information according to the first information and the second information, where the configuration information is configured to indicate a timing for the terminal device to determine to receive and process the GNSS signal to acquire or reacquire the GNSS positioning information.

step S25: the network device sends the configuration information to the terminal device 101.

step S26: the terminal device 101 receives the configuration information from the network device, where the configuration information is determined by the NTN device according to the first information and the second information, and the configuration information is configured to indicate a timing for the terminal device 101 to determine to receive and process the GNSS signal to acquire or reacquire the GNSS positioning information.

In some embodiments, the network device is the first network device 101 in the non-terrestrial network NTN.

In some embodiments, in step S21, the first information and the second information may characterize the capability, of the terminal device 101, regarding the GNSS positioning.

The first information may reflect the duration required for the terminal device 101 to receive the GNSS signal and position the location of the terminal device. The process of receiving the GNSS signal in the first information includes the process of searching for a satellite for positioning. For example, when the positioning requires the use of signals from three satellites, the process of searching for satellites includes the process of searching for the signals from three satellites, the acquiring the GNSS positioning information according to the GNSS signal in the first information includes calculating location information of the terminal device according to the GNSS signal.

The second information may reflect valid duration of the positioning information, and the positioning information may be location information of the terminal device positioned according to the GNSS signal involved in the first information.

In step S23, the network device determines suitable configuration information for the terminal device 101 with low capacity according to the first information and the second information. In step S26, the terminal device 101, according to configuration information, may determine the timing suitable for receiving and processing the GNSS signal to achieve the positioning, thus may also determine the timing for sending data.

In embodiments of the present disclosure, the terminal device 101 may report the capability regarding the GNSS positioning in the non-terrestrial network NTN system. The network device determines suitable configuration information according to the capability, of the terminal device 101, regarding the GNSS positioning, so as to validly indicate the timing for the terminal device 101 to determine to receive and process the GNSS signal to acquire or reacquire the GNSS positioning information. Thus, for the terminal device with the low capacity that cannot perform the GNSS positioning and the service data transmission at the same time, the terminal device may receive the GNSS signal and perform the positioning according to the timing configured by the network device during the communication process, and perform valid service data transmission in another period. The service data transmission is performed while the valid uplink synchronization is maintained.

The embodiments of the present disclosure provide a method for receiving configuration information. The method is performed by the terminal device 101, and the method includes steps S1-1 to S1-3:

step S1-1, the terminal device 101 determines first information and second information, where the first information corresponds to duration required for receiving a global navigation satellite system GNSS signal and acquiring GNSS positioning information according to the GNSS signal, and the second information corresponds to valid duration of the GNSS positioning information acquired by the terminal device.

step S1-2, the terminal device 101 sends the first information and the second information to a network device.

step S1-3: the terminal device 101 receives configuration information from the network device, where the configuration information is determined by the network device according to the first information and the second information, and the configuration information is configured to indicate a timing for the terminal device to determine to receive and process the GNSS signal to acquire or reacquire the GNSS positioning information.

In some embodiments, the first information may reflect the duration required for the terminal device 101 to receive the GNSS signal and position the location of the terminal device. The second information may reflect valid duration of the positioning information, and the positioning information may be location information of the terminal device positioned according to the GNSS signal involved in the first information. The terminal device 101 may perform the GNSS positioning at the timing configured by the non-terrestrial network NTN device according to the configuration information.

In an embodiment, the first information is configured to indicate a first duration interval to which the duration required for the terminal device to receive the GNSS signal and acquire the GNSS positioning information according to the GNSS signal belongs. The second information is configured to indicate a second duration interval to which the valid duration of the GNSS positioning information acquired by the terminal device belongs.

In some embodiments, the first duration intervals corresponding to different terminal devices 101 may be different, and that is, positioning capabilities of different terminal devices 101 may be different. The second duration interval is related to a movement speed of the terminal device 101, for example, the faster the movement speed of the terminal device 101, the shorter the valid duration of the positioning information.

The embodiments of the present disclosure provide a method for receiving configuration information, and the method is performed by the terminal device 101. The method includes steps S1-1, S1-2, and S1-3, and also includes step S1-0:

step S1-0: a first mapping relationship and a second mapping relationship are received from the NTN device.

The first mapping relationship includes: a mapping relationship between a first level and the first duration interval.

The second mapping relationship includes: a mapping relationship between a second level and the second duration interval.

The first information is one first level in the first mapping relationship;

the second information is one second level in the second mapping relationship.

In some embodiments, duration for the terminal device 101 to receive the GNSS signal and acquire the GNSS positioning information according to the GNSS signal is set to Ta, and the first mapping relationship includes mapping relationships between different first levels and different first duration intervals.

In some embodiments, the first duration interval may be: duration interval (t1, t2), duration interval [t2, t3], duration interval (t3, t4], where t1<t2<t3<t4. The first level includes three levels, specifically level A, level B, and level C.

The first mapping relationship includes:

when Ta is in the duration interval [t1, t2), it corresponding to level A.

when Ta is in the duration interval [t2, t3], it corresponding to level B.

When Ta is in the duration interval (t3, t4], it corresponding to level C.

In an example, t1=0) second, t2=1 second, t3=5 seconds, t4=30 seconds.

In an example, the first information is A.

In an example, the first information is B.

In an example, the first information is C.

In some embodiments, the valid duration of the GNSS positioning information acquired by the terminal device 101 is set to Td, and the second mapping relationship may include mapping relationships between different second levels and different second duration intervals. The second duration interval may be: duration interval [T1, T2), duration interval [T2, T3], duration interval (T3, T4], duration interval (T4, T5], where T1<T2<T3<T4<T5. The second level includes four levels, specifically level 1, level 2, level 3, and level 4.

The second mapping relationship includes: when Td is in the duration interval [T1, T2), it corresponding to level 1.

When Td is in the duration interval [T2, T3], it corresponding to level 2.

When Td is in the duration interval (T3, T4], it corresponding to level 3.

When Td is in the duration interval (T4, T5], it corresponding to level 4.

When Td corresponds to level 1, it indicates that the terminal device is moving at a high speed, and thus the validity period of the positioning information of the terminal device is the shortest.

When Td corresponds to level 2, it indicates that the terminal device is moving at a medium speed, and thus the validity period of the positioning information of the terminal device is relatively short.

When Td corresponds to level 3, it indicates that the terminal device is moving at a low speed, and thus the validity period of the positioning information of the terminal device is relatively long.

When Td corresponds to level 4, it indicates that the terminal device is almost stationary, and thus the validity period of the positioning information of the terminal device is the longest.

In an example, T1=0 second, T2=10 seconds, T3=30 seconds, T4=60 seconds, T5>60 seconds.

In some embodiments, the second mapping relationship includes:

When Td is in the duration interval [T1, T2), it corresponding to level 1.

When Td is in the duration interval [T2, T3], it corresponding to level 2.

When Td is in the duration interval (T3, T4], it corresponding to level 3.

When Td is greater than T4, it corresponding to level 4.

The embodiments of the present disclosure provide a method for receiving configuration information, the method is performed by the terminal device 101. The method includes steps S1-1, S1-2, and S1-3, and also includes:

determining a first duration interval and a second duration interval that are set in a communication protocol; where the first duration interval corresponds to the duration required for the terminal device to receive the GNSS signal and acquire the GNSS positioning information according to the GNSS signal, and the second duration interval corresponds to the valid duration of the GNSS positioning information acquired by the terminal device.

The embodiments of the present disclosure provide a method for receiving configuration information, the method is performed by the terminal device 101. The method includes steps S1-1, S1-2, and S1-3, and also includes:

the configuration information including first indication information and second indication information. The first indication information is configured to indicate a first cycle period, the second indication information is configured to indicate a second cycle period, and the second cycle period is a sub-period in the first cycle period.

In some embodiments, duration of the first cycle period is T_d, and the the first cycle period is related to the second duration interval corresponding to the valid duration Td of the GNSS positioning information acquired by the terminal device. The second cycle period may be referred to as GAP, and duration of the second cycle period is T_a, the second cycle period is a sub-period selected or preset in the first cycle period, and T_a is related to the first duration interval corresponding to the duration Ta for the terminal device 101 to receive the GNSS signal and acquire the GNSS positioning information according to the GNSS signal.

According to movement status of terminal device 101, Td changes. When Td changes, the second duration interval corresponding to Td also changes, and thus the first cycle period T_d is different accordingly. For each first cycle period T_d, a corresponding second cycle period GAP is reserved.

The embodiments of the present disclosure provide a method for receiving configuration information, the method is performed by the terminal device 101. The method includes steps S1-1, S1-2, and S1-3, and also includes:

the configuration information including first indication information and second indication information. The first indication information is configured to indicate a first cycle period, the second indication information is configured to indicate a second cycle period, and the second cycle period is a sub-period in the first cycle period.

Duration of the first cycle period is not greater than a minimum duration corresponding to the second information.

Duration of the second cycle period is not less than a maximum duration corresponding to the first information.

For example, when a level corresponding to the valid duration Td of the GNSS positioning information acquired by the terminal device is level 2, and when it is determined that the second duration interval corresponding to level 2 is [T2, T3], T_d satisfies: T_d≤a minimum value of [T2, T3], and then T_d≤T2.

For example, when a level corresponding to the first duration Ta for the terminal device to receive the GNSS signal and acquire the GNSS positioning information according to the GNSS signal is level B, and when it is determined that the first duration interval corresponding to level B is [t2, t3], T_a satisfies: T_a≥a maximum value of [t2, t3], and then T_a≥t3.

In the embodiments of the present disclosure, set duration and a set cycle of the second cycle period GAP may be determined. The second cycle period GAP may serve as a reserved period for positioning according to the GNSS signal, and during this period, the terminal device 101 may receive the GNSS signal and perform positioning according to GNSS signal.

The embodiments of the present disclosure provide a method for receiving configuration information, the method is performed by the terminal device 101. The method includes steps S1-1, S1-2, and S1-3, and also includes: the configuration information including first indication information and second indication information. The first indication information is configured to indicate a first cycle period, the second indication information is configured to indicate a second cycle period, and the second cycle period is a sub-period in the first cycle period. The first cycle period corresponds to consecutive radio frames, and a frame number of a starting radio frame or a frame number of an ending radio frame in the consecutive radio frames meets a first set condition; and the second cycle period corresponds to a sub-period in the first cycle period that meets a second set condition.

In some embodiments, the first set condition may indicate a location of the first cycle period, and the second set condition may indicate a location of the second cycle period in the first cycle period.

For different first cycle periods, the location configured for the second cycle period in each first cycle period may be the same or different. The duration of the second cycle period may be denoted as a number of radio frames.

In an example, each first cycle period occupies 10 radio frames, and serial numbers of radio frames occupied by the second cycle period in each first cycle period are the same, such as all being located in a first radio frame to a third radio frame of the 10 radio frames. In this example, the second cycle period occupies the same duration and the same location in the first cycle period.

In another example, each first cycle period occupies 10 radio frames, and at least two serial numbers of radio frames occupied by the second cycle period in first cycle periods are not the same. For example, radio frames occupied by a part of second cycle periods in the first cycle periods are a first radio frame to a third radio frame, while radio frames occupied by the other part of second cycle periods in the first cycle periods are a first radio frame to a fourth radio frame.

In another example, the first cycle period includes two non-consecutive parts, and each part includes a plurality of consecutive radio frames. For example, the first part includes 10 radio frames, and the second part includes 20 radio frames. For one first cycle period, the occupation location of its second cycle period may be located at the first part. For another first cycle period, the occupation location of its second cycle period may be located at the second part.

In some embodiments, the first set condition includes: a residual value of a modulo operation between the frame number of the starting radio frame or the frame number of the ending radio frame and a first value being a second value; the first indication information includes: a number of the consecutive radio frames corresponding to the first cycle period, the first value and the second value.

In some embodiments, the modulo operation may be denoted as: mod (a frame number of the starting radio frame, M)=m, where M is a first value and m is a second value. Depending on the frame number of the starting radio frame, M, and m, operation results may be different.

According to the operation results, the locations of the starting radio frame and the ending radio frame in the first cycle period may be determined respectively. For example, when m=0, i.e., when mod (a frame number of the starting radio frame, M)=0, a frame number of the starting radio frame is M, 2M, 3M, etc.

In some embodiments, the second set condition includes: the sub-period including consecutive sub-frames, and a number of the consecutive sub-frames being a third value; the second indication information includes: the third value.

In the embodiment, the number of sub-frames, i.e. the third value, indicates duration occupied by the second cycle period GAP.

In some embodiments, the second set condition includes: the sub-period including consecutive sub-frames, a number of the consecutive sub-frames being a third value, and a number of offset sub-frames from a starting sub-frame of the consecutive sub-frames to a first sub-frame of the starting radio frame in the first cycle period being a fourth value; the second indication information includes: the third value and the fourth value.

The duration of the second cycle period GAP is the third value. The fourth value may indicate a starting location of the second cycle period in the first cycle period.

In an example, the first cycle period occupies 10 radio frames. When the third value is i (i<10), it indicates that the second cycle period occupies i consecutive sub-frames in the first cycle period. The fourth value is j (j<10), which indicates that the starting sub-frame of the i consecutive sub-frames occupied by the second cycle period is offset by j sub-frames relative to the first sub-frame of the starting radio frame.

This is illustrated below in conjunction with a specific example.

The terminal device 101 sends the first information and the second information to the NTN device, where the first information is configured to indicate the first duration interval [t2, t3] to which the duration Ta required for receiving the global navigation satellite system GNSS signal and acquiring the GNSS positioning information according to the GNSS signal belongs, and the second information is configured to indicate the second duration interval [T2, T3] to which the valid duration Td of the GNSS positioning information acquired by the terminal device belongs.

The NTN device determines the configuration information according to the first information and the second information, and the configuration information includes the first indication information and the second indication information. The first indication information includes 10, 5, and 0 in sequence, and the second indication information includes 3 and 2 in sequence. The “10” in the first indication information indicates that the duration of the first cycle period T_d is duration corresponding to 10 radio frames, and the duration is less than or equal to T2; the second cycle period T_a in the second indication information is greater than or equal to t3.

The NTN device sends the configuration information to the terminal device 101.

After the terminal device 101 receives the configuration information from the NTN device, it is informed that the first cycle period T_d corresponds to 10 radio frames according to the first indication information, and the frame numbers of the starting radio frames of the first cycle period are 0, 5, 10, 15, etc. It is informed that the second cycle period occupies three consecutive sub-frames in the first cycle period according to the second indication information, and the starting sub-frame of the three consecutive sub-frames occupied by the second cycle period is offset by two sub-frames relative to the first sub-frame of the first radio frame in the first cycle period.

The embodiments of the present disclosure provide a method for sending configuration information, the method is performed by a network device in an NTN, and the method includes step S2-1 to S2-3:

step S2-1: receiving first information and second information from a terminal device; where the first information corresponds to duration required for receiving a global navigation satellite system GNSS signal and acquiring GNSS positioning information according to the GNSS signal, and the second information corresponds to valid duration of the GNSS positioning information acquired by the terminal device.

step S2-2, determining configuration information according to the first information and the second information, where the configuration information is configured to indicate a timing for the terminal device to determine to receive and process the GNSS signal to acquire or reacquire the GNSS positioning information.

step S2-3, sending the configuration information to the terminal device.

In an embodiment, the first information is configured to indicate a first duration interval to which the duration required for the terminal device to receive the GNSS signal and acquire the GNSS positioning information according to the GNSS signal belongs.

the second information is configured to indicate a second duration interval to which the valid duration of the GNSS positioning information acquired by the terminal device belongs.

The embodiments of the present disclosure provide a method for sending configuration information, the method is performed a network device in an NTN. The method includes steps S2-1, S2-2, S2-3, and further includes:

sending a first mapping relationship and a second mapping relationship to the terminal device;

the first mapping relationship includes: a mapping relationship between a first level and the first duration interval;

the second mapping relationship includes: a mapping relationship between a second level and the second duration interval;

the first information is one first level in the first mapping relationship; and the second information is one second level in the second mapping relationship.

The embodiments of the present disclosure provide a method for sending configuration information, the method is performed by a network device in an NTN. The method includes steps S2-1, S2-2, S2-3, and further includes:

the configuration information including first indication information and second indication information;

the first indication information is configured to indicate a first cycle period, the second indication information is configured to indicate a second cycle period, and the second cycle period is a sub-period in the first cycle period.

In some embodiments, duration of the first cycle period is not greater than a minimum duration corresponding to the second information; and duration of the second cycle period is not less than a maximum duration corresponding to the first information.

In some embodiments, the first cycle period corresponds to consecutive radio frames, and a frame number of a starting radio frame or a frame number of an ending radio frame in the consecutive radio frames meets a first set condition;

the second cycle period corresponds to a sub-period in the first cycle period that meets a second set condition.

In some embodiments, the first set condition includes: a residual value of a modulo operation between the frame number of the starting radio frame or the frame number of the ending radio frame and a first value being a second value;

the first indication information includes: a number of the consecutive radio frames corresponding to the first cycle period, the first value and the second value.

In some embodiments, the second set condition includes: the sub-period including consecutive sub-frames, and a number of the consecutive sub-frames being a third value;

the second indication information includes: the third value.

In some embodiments, the second set condition includes: the sub-period including consecutive sub-frames, a number of the consecutive sub-frames being a third value, and a number of offset sub-frames from a starting sub-frame of the consecutive sub-frames to a first sub-frame of the starting radio frame in the first cycle period being a fourth value;

the second indication information includes: the third value and the fourth value.

Based on the same concept as the above-described method embodiments, the embodiments of the present disclosure further provide a communication apparatus that has a function of the network device in the above-described method embodiments and is configured to perform the steps performed by the network device 102 provided by the above-described method embodiments. The function may be implemented in a form of hardware, in a form of software or in a form of hardware executing corresponding software. The hardware or software includes one or more modules corresponding to the function described above.

Figure 3:
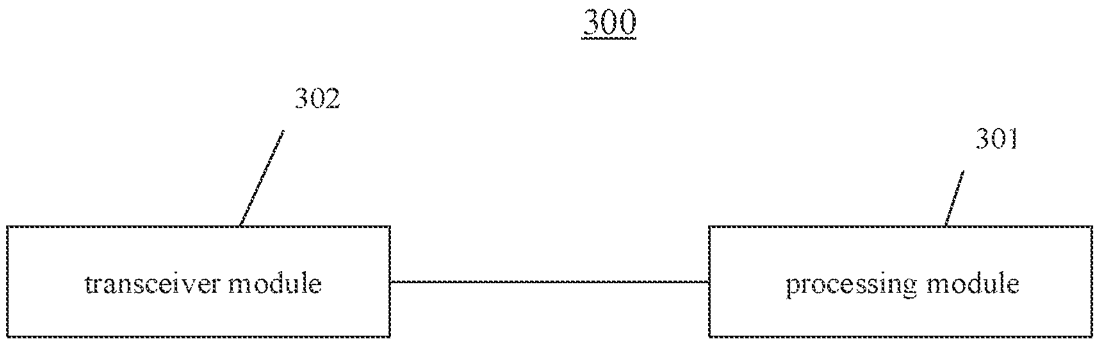
FIG. 3 is a structural diagram of an apparatus for sending configuration information according to an embodiment.

In an embodiment, FIG. 3 shows a communication apparatus 300 which may be served as the network device involved in the above-described method embodiments and perform the steps performed by the network device in the above-described method embodiments. As shown in FIG. 3, the communication apparatus 300 may include a transceiver module 301 and a processing module 302 coupled to each other. The transceiver module 301 may be configured to support the communication apparatus 300 to perform communication, and the transceiver module 301 may have a wireless communication function, for example, the transceiver module 301 may perform wireless communication with other communication apparatus through a wireless radio. The processing module 302 may be configured for the communication apparatus 300 to perform processing operations, which include, but are not limited to, generating information and a message to be transmitted by the transceiver module 301, and/or demodulating and decoding signals received by the transceiver module 301.

Figure 4:
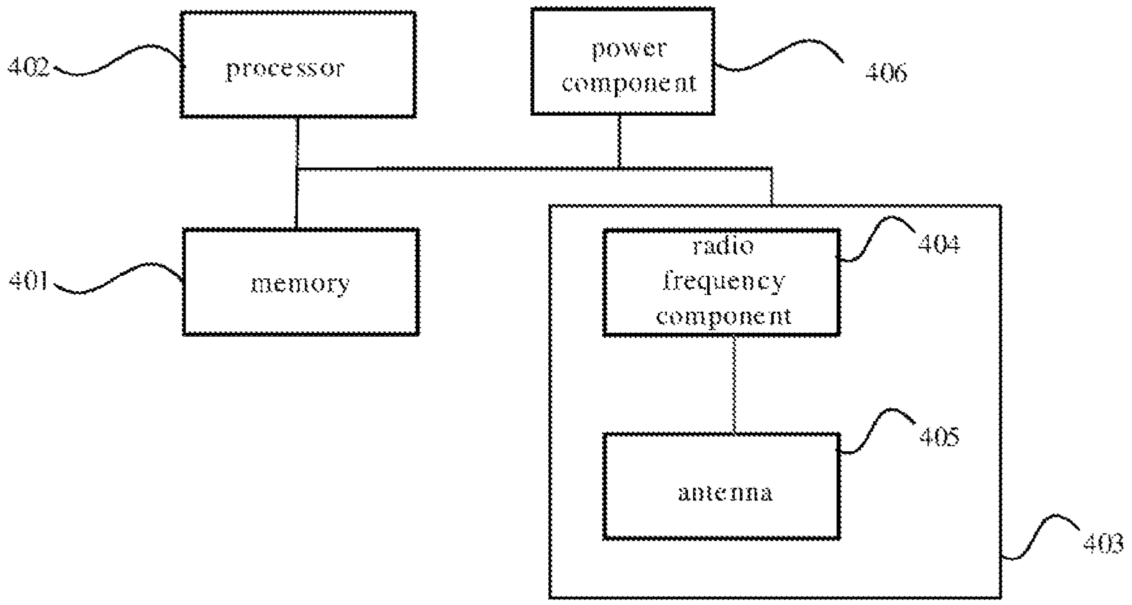
FIG. 4 is a structural diagram of another apparatus for sending configuration information according to an embodiment.

When performing the steps implemented by the network device, the transceiver module 301 is configured to receive first information and second information from a terminal device; where the first information corresponds to duration required for receiving a global navigation satellite system GNSS signal and acquiring GNSS positioning information according to the GNSS signal, and the second information corresponds to valid duration of the GNSS positioning information acquired by the terminal device. The processing module is configured to determine configuration information according to the first information and the second information, where the configuration information is configured to indicate a timing for the terminal device to determine to receive and process the GNSS signal to acquire or reacquire the GNSS positioning information. The transceiver module is further configured to send the configuration information to the terminal device In the case that the communication apparatus is the network device, it is also possible for the device to have a structure as shown in FIG. 4. The structure of the communication apparatus is illustrated with a gateway station as an example. As shown in FIG. 4, the device 400 includes a memory 401, a processor 402, a transceiving component 403, and a power component 406. The memory 401 is coupled to the processor 402 and may be configured to store programs and data necessary for the communication apparatus 400 to perform various functions. The processor 402 is configured to support the communication apparatus 400 to perform the corresponding functions in the above method, which may be implemented by invoking the program stored in the memory 401. The transceiving component 403 may be a wireless transceiver configured to support the communication apparatus 400 to receive signaling and/or data and transmit the signaling and/or data through the wireless radio. The transceiving component 403, which may also be referred to as a transceiving unit or a communication unit, may include a radio frequency component 404, which may be a remote radio unit radio (RRU), in particular for transmission of a radio frequency signal and conversion of the radio frequency signal to a baseband signal, and one or more antennas 405, in particular for radiation and reception of the radio frequency signal.

In a case that the communication apparatus 400 needs to send data, the processor 402 may perform baseband processing on the data to be sent, and output a baseband signal to a radio frequency unit. In a case that the data is sent to the communication apparatus 400, the radio frequency unit receives the radio frequency signal through the antenna, converts the radio frequency signal into the baseband signal, and outputs the baseband signal to the processor 402. The processor 402 converts the baseband signal to data and processes the data.

Based on the same concept as the above-described method embodiments, embodiments of the present disclosure further provide a communication apparatus that may have a function of the terminal device 101 in the above-described method embodiments and may be configured to perform the steps performed by the terminal device 101 provided by the above-described method embodiments. The function may be implemented in a form of hardware, in a form of software or in the form of hardware executing corresponding software. The hardware or software includes one or more modules corresponding to the function described above.

Figure 5:
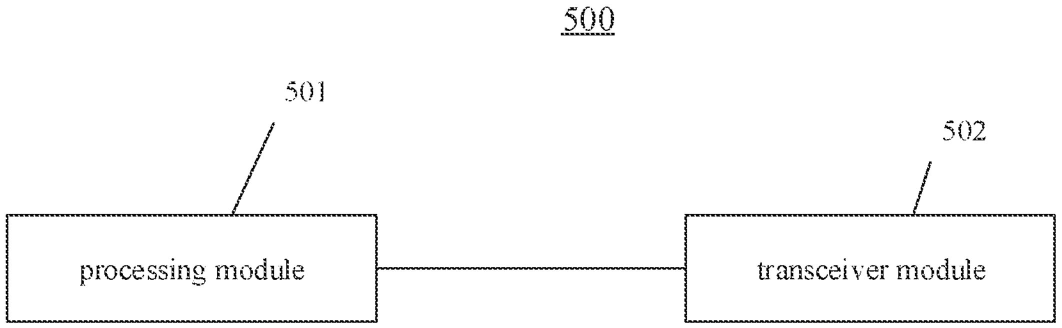
FIG. 5 is a structural diagram of an apparatus for receiving configuration information according to an embodiment.

In an embodiment, FIG. 5 shows a communication apparatus 500 which may be served as the terminal device 101 involved in the above-described method embodiments and perform the steps performed by the terminal device 101 in the above-described method embodiments. As shown in FIG. 5, the communication apparatus 500 may include a processing module 501 and a transceiver module 502 coupled to each other. The processing module 501 may be configured for the communication apparatus to perform processing operations, such as generating information/messages to be sent, or processing a received signal to acquire information/message. The transceiver module 502 may have a wireless communication function, for example, the transceiver module 501 may perform wireless communication with other communication apparatus through a wireless radio.

When performing the steps implemented by the terminal device 101, the processing module 501 is configured to determine first information and second information, where the first information corresponds to duration required for receiving a global navigation satellite system GNSS signal and acquiring GNSS positioning information according to the GNSS signal, and the second information corresponds to valid duration of the GNSS positioning information acquired by a terminal device. The transceiver module 502 is configured to send the first information and the second information to a network device, and the transceiver module 502 is further configured to receive configuration information from the network device, where the configuration information is determined by the network device according to the first information and the second information, and the configuration information is configured to indicate a timing for the terminal device to determine to receive and process the GNSS signal to acquire or reacquire the GNSS positioning information.

Figure 6:
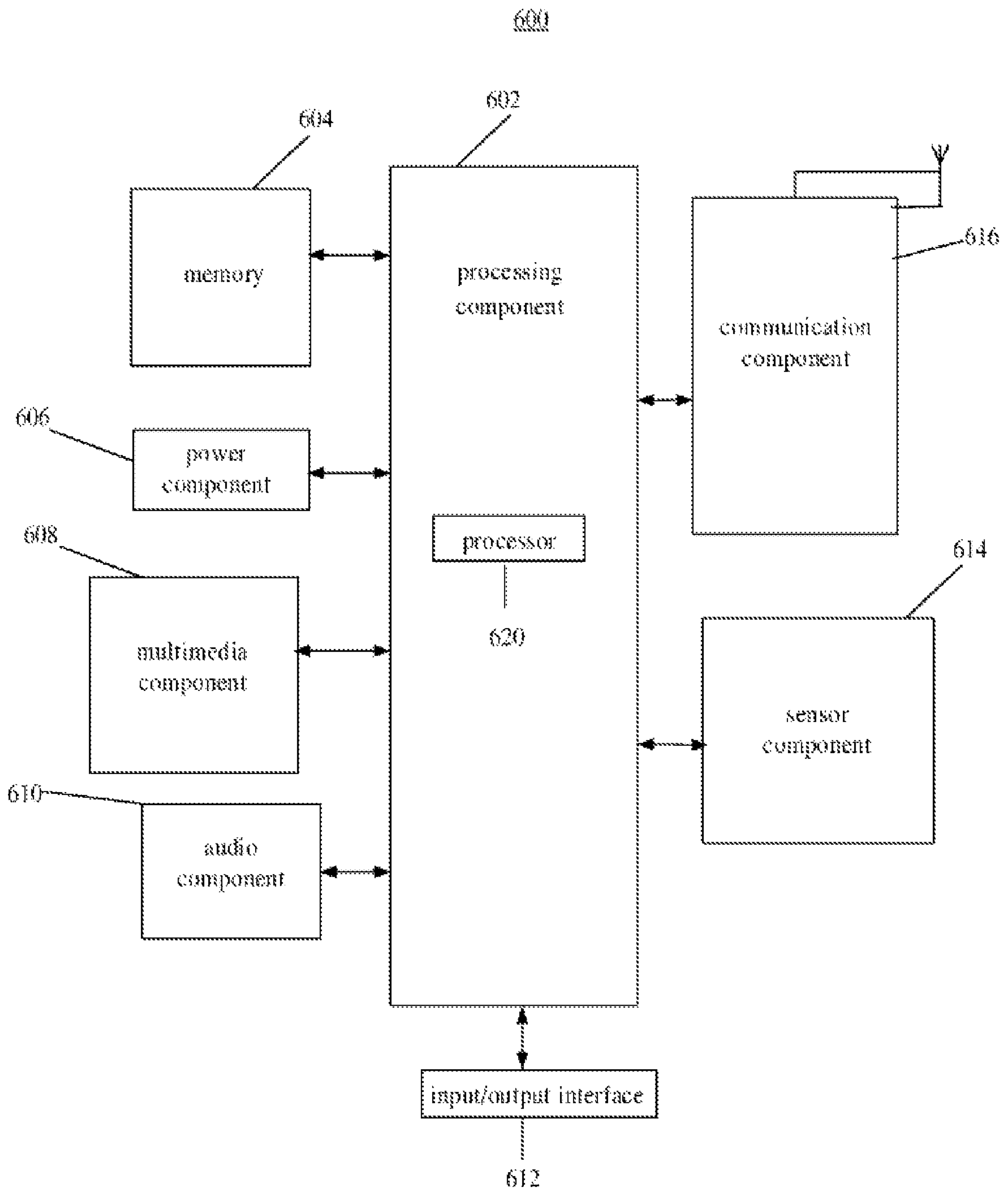
FIG. 6 is a structural diagram of another apparatus for receiving configuration information according to an embodiment.

In the case that the communication apparatus is the terminal device 101, it is also possible for the device to have a structure as shown in FIG. 6. A device 600 shown in FIG. 6 may be a mobile phone, a computer, a digital broadcast terminal, a messaging device, a game console, a tablet device, a medical device, a fitness device, or a personal digital assistant.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, phone calls, data communications, camera operations, and recording operations. The processing component 602 can include one or more processors 620 to execute instructions to perform all or some of the steps in the above-described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, videos, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP) If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and/or the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as keyboards, click wheels, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may further include a light sensor, such as a CMOS or CCD image sensor, for use in imaging applications. In some embodiments, the sensor component 614 may further include an accelerometer sensor, a gyroscope sensor, a magnetic sensor, a pressure sensor, or a temperature sensor.

The communication component 616 is configured to facilitate communication, wired or wireless, between the device 600 and other devices. The device 600 can access a wireless network based on a communication standard, such as Wi-Fi, 2G, or 3G, or a combination thereof. In an embodiment, the communication component 616 receives a broadcast signal or broadcast associated information from an external broadcast management system via a broadcast channel. In an embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned method.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

According to a first aspect of embodiments of the present disclosure, a method for receiving configuration information is provided, the method is performed by a terminal device in a non-terrestrial network and includes.

- determining first information and second information, where the first information corresponds to duration required for receiving a global navigation satellite system GNSS signal and acquiring GNSS positioning information according to the GNSS signal, and the second information corresponds to valid duration of the GNSS positioning information acquired by the terminal device;
- sending the first information and the second information to a network device, and
- receiving configuration information from the network device, where the configuration information is determined by the network device according to the first information and the second information, and the configuration information is configured to indicate a timing for the terminal device to determine to receive and process the GNSS signal to acquire or reacquire the GNSS positioning information.

In an embodiment, the first information is configured to indicate a first duration interval to which the duration required for the terminal device to receive the GNSS signal and acquire the GNSS positioning information according to the GNSS signal belongs; and

- the second information is configured to indicate a second duration interval to which the valid duration of the GNSS positioning information acquired by the terminal device belongs.

In an embodiment, the method further includes:

- receiving a first mapping relationship and a second mapping relationship from the NTN device;

where the first mapping relationship includes: a mapping relationship between a first level and the first duration interval;

the second mapping relationship includes: a mapping relationship between a second level and the second duration interval;

the first information is one first level in the first mapping relationship; and the second information is one second level in the second mapping relationship.

In an embodiment, the method further includes: determining a first duration interval and a second duration interval that are set in a communication protocol; where the first duration interval corresponds to the duration required for the terminal device to receive the GNSS signal and acquire the GNSS positioning information according to the GNSS signal, and the second duration interval corresponds to the valid duration of the GNSS positioning information acquired by the terminal device.

In an embodiment, the configuration information includes first indication information and second indication information; and the first indication information is configured to indicate a first cycle period, the second indication information is configured to indicate a second cycle period, and the second cycle period is a sub-period in the first cycle period.

In an embodiment, duration of the first cycle period is not greater than a minimum duration corresponding to the second information; and duration of the second cycle period is not less than a maximum duration corresponding to the first information.

In an embodiment, the first cycle period corresponds to consecutive radio frames, and a frame number of a starting radio frame or a frame number of an ending radio frame in the consecutive radio frames meets a first set condition; and the second cycle period corresponds to a sub-period in the first cycle period that meets a second set condition.

In an embodiment, the first set condition includes: a residual value of a modulo operation between the frame number of the starting radio frame or the frame number of the ending radio frame and a first value being a second value; and the first indication information includes: a number of the consecutive radio frames corresponding to the first cycle period, the first value and the second value.

In an embodiment, the second set condition includes: the sub-period including consecutive sub-frames, and a number of the consecutive sub-frames being a third value; and the second indication information includes: the third value.

In an embodiment, the second set condition includes: the sub-period including consecutive sub-frames, a number of the consecutive sub-frames being a third value, and a number of offset sub-frames from a starting sub-frame of the consecutive sub-frames to a first sub-frame of the starting radio frame in the first cycle period being a fourth value; and the second indication information includes: the third value and the fourth value.

According to a second aspect of embodiments of the present disclosure, a method for sending configuration information is provided, the method is performed by a network device in a non-terrestrial network NTN and includes receiving first information and second information from a terminal device; where the first information corresponds to duration required for receiving a global navigation satellite system GNSS signal and acquiring GNSS positioning information according to the GNSS signal, and the second information corresponds to valid duration of the GNSS positioning information acquired by the terminal device;

determining configuration information according to the first information and the second information, where the configuration information is configured to indicate a timing for the terminal device to determine to receive and process the GNSS signal to acquire or reacquire the GNSS positioning information; and sending the configuration information to the terminal device.

In an embodiment, the first information is configured to indicate a first duration interval to which the duration required for the terminal device to receive the GNSS signal and acquire the GNSS positioning information according to the GNSS signal belongs, and the second information is configured to indicate a second duration interval to which the valid duration of the GNSS positioning information acquired by the terminal device belongs.

In an embodiment, the method further includes:

sending a first mapping relationship and a second mapping relationship to the terminal device;

where the first mapping relationship includes: a mapping relationship between a first level and the first duration interval;

the second mapping relationship includes: a mapping relationship between a second level and the second duration interval;

the first information is one first level in the first mapping relationship; and the second information is one second level in the second mapping relationship.

In an embodiment, the configuration information includes first indication information and second indication information; and the first indication information is configured to indicate a first cycle period, the second indication information is configured to indicate a second cycle period, and the second cycle period is a sub-period in the first cycle period.

In an embodiment, duration of the first cycle period is not greater than a minimum duration corresponding to the second information; and duration of the second cycle period is not less than a maximum duration corresponding to the first information.

In an embodiment, the first cycle period corresponds to consecutive radio frames, and a frame number of a starting radio frame or a frame number of an ending radio frame in the consecutive radio frames meets a first set condition; and the second cycle period corresponds to a sub-period in the first cycle period that meets a second set condition.

In an embodiment, the first set condition includes: a residual value of a modulo operation between the frame number of the starting radio frame or the frame number of the ending radio frame and a first value being a second value; and the first indication information includes: a number of the consecutive radio frames corresponding to the first cycle period, the first value and the second value.

In an embodiment, the second set condition includes: the sub-period including consecutive sub-frames, and a number of the consecutive sub-frames being a third value; and the second indication information includes: the third value.

In an embodiment, the second set condition includes: the sub-period including consecutive sub-frames, a number of the consecutive sub-frames being a third value, and a number of offset sub-frames from a starting sub-frame of the consecutive sub-frames to a first sub-frame of the starting radio frame in the first cycle period being a fourth value; and the second indication information includes: the third value and the fourth value.

According to a third aspect of embodiments of the present disclosure, a communication apparatus is provided. The communication apparatus may be configured to perform the step(s) performed by the terminal device of the first aspect or any possible design of the first aspect described above. The terminal device may implement the functions of the above methods in a form of a hardware structure, a software module, or a combination of a hardware structure and a software module.

In a case that the communication apparatus shown in the third aspect is implemented by means of the software module, the communication device may include a processing module and a transceiver module coupled to each other. The processing module is configured for the communication device to perform a processing operation, such as generating information/message to be sent, or processing a received signal to acquire information/message, the transceiver module is configured to support the communication device to perform communication.

When performing the steps of the above first aspect, the processing module is configured to determine first information and second information, where the first information corresponds to duration required for receiving a global navigation satellite system GNSS signal and acquiring GNSS positioning information according to the GNSS signal, and the second information corresponds to valid duration of the GNSS positioning information acquired by a terminal device. The transceiver module is configured to send the first information and the second information to a network device, and the transceiver module is further configured to receive configuration information from the network device, where the configuration information is determined by the network device according to the first information and the second information, and the configuration information is configured to indicate a timing for the terminal device to determine to receive and process the GNSS signal to acquire or reacquire the GNSS positioning information.

According to a fourth aspect of embodiments of the present disclosure, a communication apparatus is provided. The communication apparatus may be configured to perform the step(s) performed by the network device of the second aspect or any possible design of the second aspect described above. The network device may implement the functions of the above methods in a form of a hardware structure, a software module, or a combination of a hardware structure and a software module.

In a case that the communication apparatus shown in the fourth aspect is implemented by means of the software module, the communication device may include a transceiver module and a processing module coupled to each other. The transceiver module is configured to support the communication device to perform communication, and the processing module is configured for the communication device to perform a processing operation, such as generating information/message to be sent, or processing a received signal to acquire information/message.

When performing the steps of the above second aspect, the transceiver module 301 is configured to receive first information and second information from a terminal device; where the first information corresponds to duration required for receiving a global navigation satellite system GNSS signal and acquiring GNSS positioning information according to the GNSS signal, and the second information corresponds to valid duration of the GNSS positioning information acquired by the terminal device. The processing module is configured to determine configuration information according to the first information and the second information, where the configuration information is configured to indicate a timing for the terminal device to determine to receive and process the GNSS signal to acquire or reacquire the GNSS positioning information. The transceiver module is further configured to send the configuration information to the terminal device.

According to a fifth aspect of embodiments of the present disclosure, a communication apparatus is provided and includes a processor and a memory; the memory is configured to store a computer program; and the processor is configured to execute the computer program to implement the first aspect or any possible design of the first aspect described above.

According to a sixth aspect of embodiments of the present disclosure, a communication apparatus is provided and includes a processor and a memory; the memory is configured to store a computer program; and the processor is configured to execute the computer program to implement the second aspect or any possible design of the second aspect described above.

According to a seventh aspect of embodiments of the present disclosure, a non-transitory computer-readable storage medium is provided, the non-transitory computer-readable storage medium instructions stored thereon, where when the instructions are called and executed on a computer, the computer performs the first aspect or any possible design of the first aspect described above.

According to an eighth aspect of embodiments of the present disclosure, a non-transitory computer-readable storage medium is provided, the non-transitory computer-readable storage medium instructions stored thereon, where when the instructions are called and executed on a computer, the computer performs the second aspect or any possible design of the second aspect described above.

INDUSTRIAL APPLICABILITY

The terminal device 101 may report the capability regarding the GNSS positioning in the non-terrestrial network NTN system. The network device determines suitable configuration information according to the capability, of the terminal device 101, regarding the GNSS positioning, so as to validly indicate the timing for the terminal device 101 to determine to receive and process the GNSS signal to acquire or reacquire the GNSS positioning information. Thus, for the terminal device with the low capacity that cannot perform the GNSS positioning and the service data transmission at the same time, the terminal device may receive and process the GNSS signal as well as perform the positioning according to the timing configured by the network device during the communication process, and perform valid service data transmission in another period. The service data transmission is performed while the valid uplink synchronization is maintained.

What is claimed is:

1. A method for receiving configuration information, performed by a terminal device in a non-terrestrial network (NTN), comprising:

sending, by the terminal device, first information and second information to a network device; and receiving, by the terminal device, configuration information from the network device, wherein the configuration information is configured to indicate a timing for the terminal device to determine to receive and process a global navigation satellite system (GNSS) signal to acquire or reacquire GNSS positioning information;

wherein the first information is configured to indicate a first duration interval to which a duration required for the terminal device to receive the GNSS signal and acquire the GNSS positioning information according to the GNSS signal belongs;

the second information is configured to indicate a second duration interval to which a valid duration of the GNSS positioning information acquired by the terminal device belongs; and the first duration interval and the second duration interval are used for characterizing a capability, of the terminal device, regarding GNSS positioning.

2. The method according to claim 1, further comprising:

receiving a first mapping relationship and a second mapping relationship from the terminal device;

wherein the first mapping relationship comprises: a mapping relationship between a first level and the first duration interval;

the second mapping relationship comprises: a mapping relationship between a second level and the second duration interval;

the first information is one first level in the first mapping relationship; and the second information is one second level in the second mapping relationship.

3. The method according to claim 1, further comprising:

determining the first duration interval and the second duration interval that are set in a communication protocol; wherein the first duration interval corresponds to the duration required for the terminal device to receive the GNSS signal and acquire the GNSS positioning information according to the GNSS signal, and the second duration interval corresponds to the valid duration of the GNSS positioning information acquired by the terminal device.

4. The method according to claim 1, wherein the configuration information comprises first indication information and second indication information; and the first indication information is configured to indicate a first cycle period, the second indication information is configured to indicate a second cycle period, and the second cycle period is a sub-period in the first cycle period.

5. The method according to claim 4, wherein duration of the first cycle period is not greater than a minimum duration corresponding to the second information; and duration of the second cycle period is not less than a maximum duration corresponding to the first information.

6. The method according to claim 4, wherein the first cycle period corresponds to consecutive radio frames, and a frame number of a starting radio frame or a frame number of an ending radio frame in the consecutive radio frames meets a first set condition; and the second cycle period corresponds to a sub-period in the first cycle period that meets a second set condition.

7. The method according to claim 6, wherein the first set condition comprises: a residual value of a modulo operation between the frame number of the starting radio frame or the frame number of the ending radio frame and a first value being a second value; and the first indication information comprises: a number of the consecutive radio frames corresponding to the first cycle period, the first value and the second value.

8. The method according to claim 6, wherein the second set condition comprises: the sub-period comprising consecutive sub-frames, and a number of the consecutive sub-frames being a third value; and the second indication information comprises: the third value.

9. The method according to claim 6, wherein the second set condition comprises: the sub-period comprising consecutive sub-frames, a number of the consecutive sub-frames being a third value, and a number of offset sub-frames from a starting sub-frame of the consecutive sub-frames to a first sub-frame of the starting radio frame in the first cycle period being a fourth value; and the second indication information comprises: the third value and the fourth value.

10. A method for sending configuration information, performed by a network device in a non-terrestrial network (NTN), comprising:

receiving, by the network device, first information and second information from a terminal device;

and sending, by the network device, configuration information to the terminal device, wherein the configuration information is configured to indicate a timing for the terminal device to determine to receive and process a global navigation satellite system (GNSS) signal to acquire or reacquire GNSS positioning information;

wherein the first information is configured to indicate a first duration interval to which a duration required for the terminal device to receive the GNSS signal and acquire the GNSS positioning information according to the GNSS signal belongs; and the second information is configured to indicate a second duration interval to which a valid duration of the GNSS positioning information acquired by the terminal device belongs; and the first duration interval and the second duration interval are used for characterizing a capability, of the terminal device, regarding GNSS positioning.

11. The method according to claim 10, further comprising:

sending a first mapping relationship and a second mapping relationship to the terminal device;

wherein the first mapping relationship comprises: a mapping relationship between a first level and the first duration interval;

the second mapping relationship comprises: a mapping relationship between a second level and the second duration interval;

the first information is one first level in the first mapping relationship; and the second information is one second level in the second mapping relationship.

12. The method according to claim 10, wherein the configuration information comprises first indication information and second indication information; and the first indication information is configured to indicate a first cycle period, the second indication information is configured to indicate a second cycle period, and the second cycle period is a sub-period in the first cycle period.

13. The method according to claim 12, wherein duration of the first cycle period is not greater than a minimum duration corresponding to the second information; and duration of the second cycle period is not less than a maximum duration corresponding to the first information.

14. The method according to claim 12, wherein the first cycle period corresponds to consecutive radio frames, and a frame number of a starting radio frame or a frame number of an ending radio frame in the consecutive radio frames meets a first set condition; and the second cycle period corresponds to a sub-period in the first cycle period that meets a second set condition.

15. The method according to claim 14, wherein the first set condition comprises: a residual value of a modulo operation between the frame number of the starting radio frame or the frame number of the ending radio frame and a first value being a second value; and the first indication information comprises: a number of the consecutive radio frames corresponding to the first cycle period, the first value and the second value.

16. The method according to claim 14, wherein the second set condition comprises: the sub-period comprising consecutive sub-frames, and a number of the consecutive sub-frames being a third value; and the second indication information comprises: the third value.

17. The method according to claim 14, wherein the second set condition comprises: the sub-period comprising consecutive sub-frames, a number of the consecutive sub-frames being a third value, and a number of offset sub-frames from a starting sub-frame of the consecutive sub-frames to a first sub-frame of the starting radio frame in the first cycle period being a fourth value; and the second indication information comprises: the third value and the fourth value.

18. A terminal device, comprising:

a processor; and a memory storing a computer program executable by the processor;

wherein the processor is configured to execute the computer program stored in the memory to:

send, by the terminal device, first information and second information to a network device; and receive, by the terminal device, configuration information from the network device, wherein the configuration information is configured to indicate a timing for the terminal device to determine to receive and process a global navigation satellite system (GNSS) signal to acquire or reacquire GNSS positioning information;

wherein the first information is configured to indicate a first duration interval to which a duration required for the terminal device to receive the GNSS signal and acquire the GNSS positioning information according to the GNSS signal belongs;

the second information is configured to indicate a second duration interval to which a valid duration of the GNSS positioning information acquired by the terminal device belongs; and the first duration interval and the second duration interval are used for characterizing a capability, of the terminal device, regarding GNSS positioning.

* * * * *